Feb. 21, 1939.  E. A. H. HONORÉ  2,148,267
METHOD OF AND APPARATUS FOR RADIOGONIOMETRIC INDICATION
Filed July 31, 1935  2 Sheets-Sheet 1
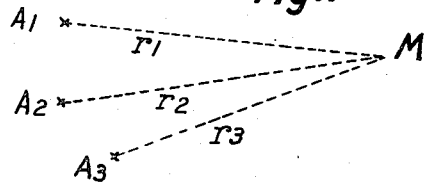
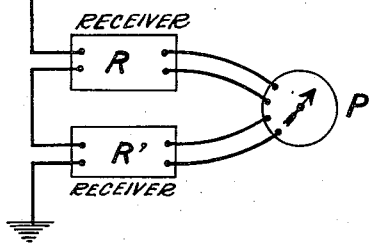
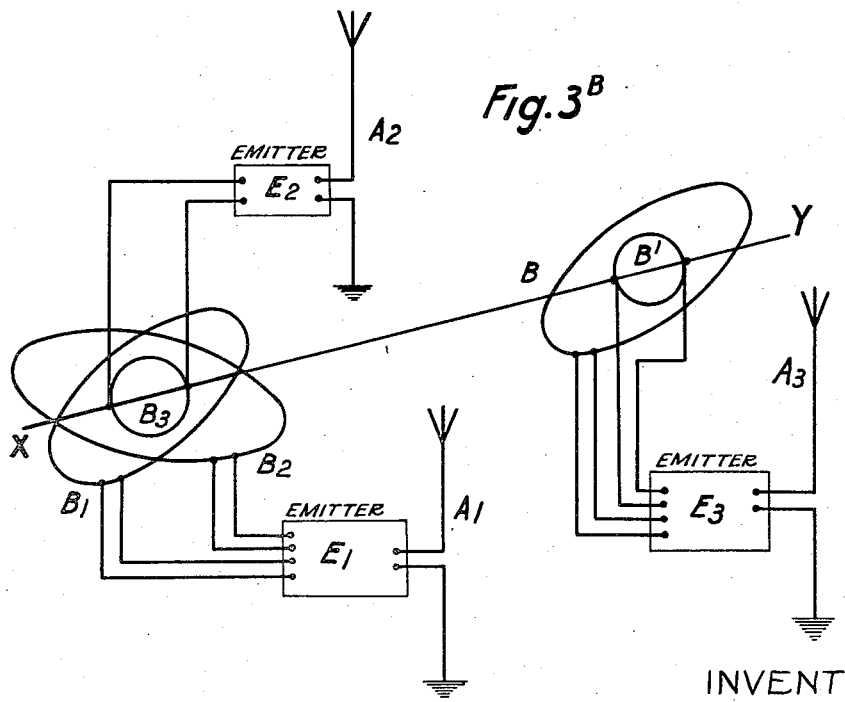
INVENTOR
ETIENNE AUGUSTIN HENRI HONORÉ
BY Haseltine Lake & Co.
ATTORNEYS Feb. 21, 1939.  E. A. H. HONORÉ  2,148,267
METHOD OF AND APPARATUS FOR RADIOGONIOMETRIC INDICATION
Filed July 31, 1935  2 Sheets-Sheet 2
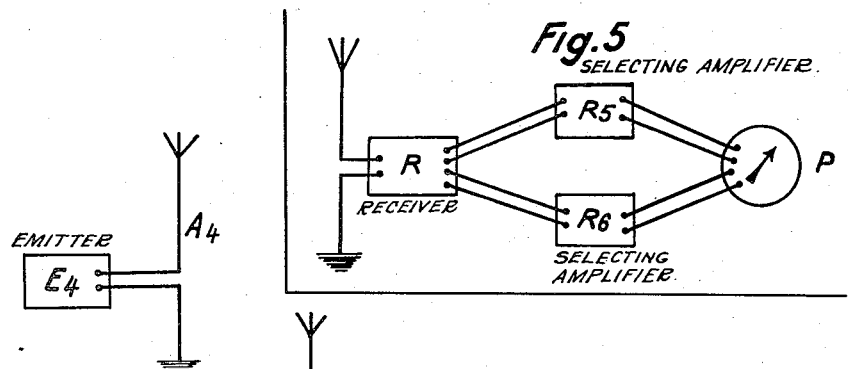
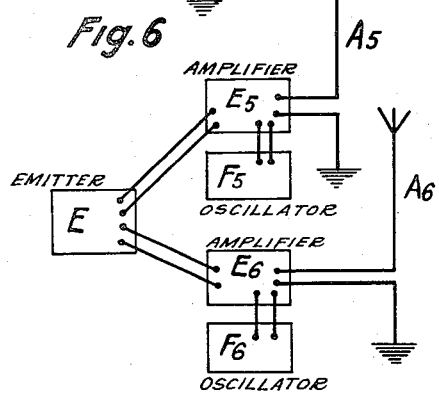
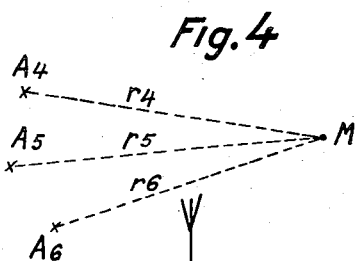
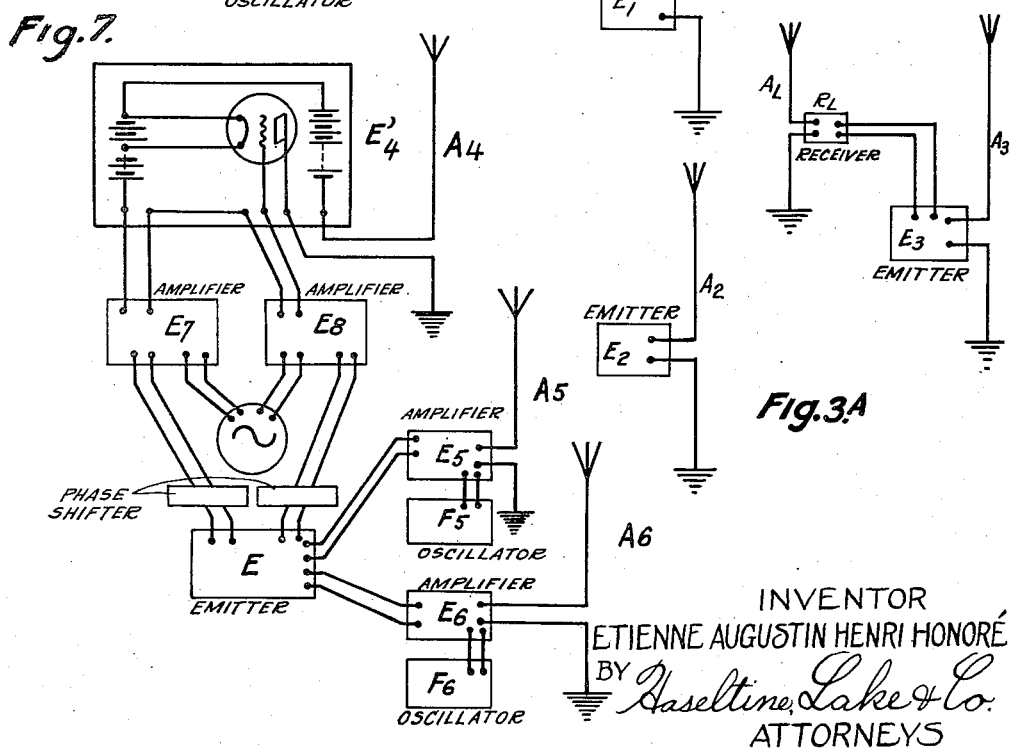
INVENTOR
ETIENNE AUGUSTIN HENRI HONORÉ
BY Haseltine, Lake & Co.
ATTORNEYS Patented Feb. 21, 1939

2,148,267

UNITED STATES PATENT OFFICE

2,148,267

METHOD OF AND APPARATUS FOR RADIO-GONIOMETRIC INDICATION

Etienne Augustin Henri Honoré, Paris, France

Application July 31, 1935, Serial No. 33,995
In France August 11, 1934

7 Claims. (Cl. 250—11)

This invention is for improvements in or relating to a method of and apparatus for radiogoniometric indication.

The object of the present invention is to provide means whereby a receiving station may ascertain the position of one or more transmitting stations with relation to its own bearing. The invention in particular applies to the use of electromagnetic waves for guiding vessels and aircraft.

The majority of methods hitherto employed for similar objects confine themselves practically to observing the cancellation and the intensity of a current (zero method) or a comparison between the intensities of two currents.

The method constituting the subject of the present application is based on measuring the relative phase displacement of two currents and consists substantially in causing the emission by one or more transmitting stations of two waves of different frequencies modulated according to a single low frequency, in separating such waves on reception, and in receiving these waves at the receiving station, detecting them separately and measuring the relative difference of phase of the two currents thus obtained. By the simple effect of the interference or of the differences in distance travelled by the waves emitted, the difference of phase of these waves and at the same time the difference of phase of the currents detected, varies with the position of the point of reception. The amount of this difference of phase thus gives an amount corresponding to the position of this point.

In the device described in detail hereafter, this measure gives the difference of the distances separating the receiving station from two different transmitting aerials. To cite by way of example, one application of this device, it will be understood that if the two transmitting aerials are located one above the other on the same vertical, the difference of phase measured at the receiving station will be nil when this station is on the horizontal plane equidistant from the two transmitting aerials, and that this difference of phase will increase with the altitude of the receiving station.

The invention is hereinafter described with reference to the accompanying drawings, in which:

Figures 1 and 4 show a diagram of the general arrangement,

Figures 2 and 5 show two variations of the diagram of the receiving station,

Figures 3A, 3B, 6 and 7 show four variations of the device supplying the transmitting aerials.

Referring to the drawings the emitting station (Figure 1) comprises three aerials $A_1$, $A_2$, $A_3$, traversed respectively by currents the values of whose intensities are as follows:

$$i_1 = a_1 \cdot \cos(2\pi f t + \alpha_1)$$
$$i_2 = a_2 \cdot \cos\{2\pi(f+n)t + \alpha_2\}$$
$$i_3 = [a_3 + b_3 \cos(2\pi n t + \beta_3)] \cdot \cos(2\pi f' t + \alpha_3)$$

$a_1$, $a_2$, $a_3$, $b_3$, $\alpha_1$, $\alpha_2$, $\alpha_3$, $\beta_3$, being constants, $t$ being the time, $f$ and $f'$ being high quite distinct frequencies and $n$ a low frequency.

It will be seen that the aerials $A_1$ and $A_2$ emit pure waves, the frequencies of which $f$ and $f+n$ only differ from each other by a low frequency $n$ equal for example to 100 periods per second. On the other hand, the aerial $A_3$ emits a modulated wave, the high frequency $f'$ of which is quite different from those of the waves of $A_1$ and $A_2$, and the modulation frequency of which is exactly equal to the previously mentioned low frequency $n$.

At a point M (Figure 1), the distances from which to the aerials $A_1$, $A_2$, $A_3$ are respectively $r_1$, $r_2$, $r_3$, the electromagnetic fields produced by the three aerials have respectively the following values:

$$h_1 = c_1 \cdot \cos(2\pi f t_1 + \alpha_1)$$
$$h_2 = c_2 \cdot \cos\{2\pi(f+n)t_2 + \alpha_2\}$$
$$h_3 + \{c_3 + d_3 \cos(2\pi n t_3 + \beta_3)\} \cdot \cos(2\pi f' t_3 + \alpha_3) \cdot$$

$c_1$, $c_2$, $c_3$, $d_3$ being constants, and the values $t_1$, $t_2$, $t_3$ being respectively equal to:

$$t - \frac{r_1}{V};\ t - \frac{r_2}{V};\ t - \frac{r_3}{V},$$

V being the velocity of propagation of the electromagnetic waves.

For greater clearness, these may be written:

$$h_1 = c_1 \cdot \cos(2\pi f t + \gamma_1)$$
$$h_2 = c_2 \cdot \cos\{2\pi(f+n) \cdot t + \gamma_2\}$$
$$h_3 = \{c_3 + d_3 \cos(2\pi n t + \delta_3)\} \cdot \cos(2\pi f' t + \gamma_3)$$

the constants $\gamma_1$, $\gamma_2$, $\gamma_3$, $\delta_3$, having as values:

$$\gamma_1 = \alpha_1 - 2\pi\frac{fr_1}{V},\ \gamma_2 = \alpha_2 - 2\pi\frac{(f+n)r_2}{V}$$

$$\gamma_3 = \alpha_3 - 2\pi\frac{f'r_3}{V},\ \delta_3 = \alpha_3 - 2\pi\frac{nr_3}{V}$$

The receiving station located at the point M comprises two distinct receivers R and R' (Figure 2).

The receiver R, regulated so as to receive waves of high frequency equal or approximately equal to $f$, is sensitive to the electromagnetic fields $h_1$ and $h_2$ since the frequency of $h_1$ is exactly $f$ and that of $h_2$ only differs from this by a low frequency $n$.

On the contrary, the receiver R is insensitive to the field $h_3$, whose frequency $f'$ is quite distinct from $f$.

The receiver R is thus sensitive to the electromotive force $u$ created by the fields $h_1$ and $h_2$ in the receiving aerial and which is expressed by $u = k_1 h_1 + k_2 h_2$, $k_1$ and $k_2$ being constants.

After high frequency amplification and then detection, the receiver R delivers a current the intensity $i$ of which has for its value according to the theory of beats and of detection:

$$i = k \cdot \cos(2\pi n t + \gamma_2 - \gamma_1)$$

$k$ being a constant and the angle $2\pi n t + \gamma_2 - \gamma_1$ being the relative difference of phase of the fields $h_1$ and $h_2$ at the point of reception.

In the same way, the receiver R' regulated so as to receive the high frequency waves equal or approximately equal to $f'$, is sensitive to the field $h_3$. After high frequency amplification and then detection, the receiver R' delivers a current, the intensity of which is:

$$i' = k' \cdot \cos(2\pi n t + \delta_3)$$

$k'$ being a constant and the angle $2\pi n t + \delta_3$ being that which occurs in the modulation of the field $h_3$.

The currents $i$ and $i'$ delivered separately by the receivers R and R' may, if it is necessary, be amplified separately by two distinct low frequency amplifiers. They are then sent into a phase-meter P (Figure 2). This apparatus, well known in itself, measures their difference of phase by giving the indication:

$$\psi = (2\pi n t + \gamma_2 - \gamma_1) - (2\pi n t + \delta_3) + \gamma - \gamma' + \delta$$

$\gamma$ and $\gamma'$ being differences of phase produced respectively by the two above-mentioned low frequency amplifiers, and $\delta$ being a regulation constant of the phase meter.

Preferably this regulation will be made so that: $\gamma - \gamma' + \delta = 0$. In this case, it may be very fine in a particularly simple manner by interchanging the two currents $i$ and $i'$ on their entry into the two low frequency amplifiers; the indication of the phase meter should then retain its amount, simply changing the sign.

The indication of the phase meter then becomes:

$$\psi = (2\pi n t + \gamma_2 - \gamma_1) - (2\pi n t + \delta_3)$$

$$= \gamma_2 - \gamma_1 - \delta_3$$

$$= \left\{\alpha_2 - 2\pi \frac{(f+n)r_2}{V}\right\} - \left\{\alpha_1 - 2\pi \frac{fr_1}{V}\right\} - \left\{\beta_3 - 2\pi \frac{nr_3}{V}\right\}$$

$$= 2\pi f \frac{r_1 - r_2}{V} + 2\pi n \frac{r_3 - r_2}{V} + \alpha_2 - \alpha_1 - \beta_3$$

Now $n$ being a low frequency, the angle $$2\pi n \frac{r_3 - r_2}{V}$$

is negligible. In fact, if for example $n$ be taken as equal to 100 periods per second, $r_3 - r_2$ equals 1 kilometer V being equal to 300,000 kilometers per second, there is given $$2\pi n \frac{r_3 - r_2}{V} = 0.12$$

of a degree sexagesimal.

On the other hand, the value: $\alpha_2 - \alpha_1 - \beta_3$, the regulating constant of the emitting station may be easily cancelled.

By calling $\lambda$ the wave length corresponding to the frequency $f$, the indication of the phase-meter then becomes:

$$\psi = 2\pi \frac{r_1 - r_2}{\lambda}$$

that is to say, that it measures the difference of the distances from the receiving station to the emitting aerials $A_1$ and $A_2$, these distances being measured in wave lengths $\lambda$.

The supply to the aerials of the emitting station may be carried out in various ways, in particular by the two following ones:

The first which is represented in Fig. 3A, consists in utilizing for the three aerials $A_1$, $A_2$, $A_3$, three distinct transmitters. The two first ones $E_1$, $E_2$, each give a pure wave, the frequencies of which ($f$ and $f+n$) only differ from each other by a low frequency ($n$). A receiver $R_L$ with an aerial $A_L$ sensitive to these two waves then gives after detection a current of low frequency ($n$) which is used to modulate the third transmitter $E_3$. The latter, intended to feed the aerial $A_3$, is regulated to a high frequency ($f'$) quite distinct from the two former ones.

This process has the advantage of very great simplicity. In particular it does not require any mechanical or electrical connection between the three transmitters which each feed only one of the three emitting aerials, $A_1$, $A_2$, $A_3$.

In the second method, the low frequency $n$ instead of being the result of the interferences of two closely adjacent waves but independent high frequencies, is determined mechanically by a machine, the axis X Y (Figure 3B) of which rotates at the speed of $n$ turns per second. A first emitter $E_1$ delivers to the aerial $A_1$ a current of high frequency $f$ not modulated. The same emitter delivers to two coils $B_1$, $B_2$, identical with and perpendicular to each other, currents of the same high frequency $f$ shifted in phase one with respect to the other by $\pi/2$ by any known process. There is produced in the two coils a field rotating at the speed of $f$ turns per second. A third coil $B_3$ located in this field and fixed to the axis X Y above mentioned, rotates in the opposite direction to this field at the speed of $n$ revolutions per second and consequently form the seat of an electromotive force of the frequency $f+n$. By amplifying the current which it delivers by means of the amplifier $E_2$, there is obtained the current necessary for supplying the aerial $A_2$.

The aerial $A_3$, on the other hand, is supplied by a transmitter $E_3$ regulated to the high frequency $f'$. The modulation of the current supplied by this emitter is controlled by the above-mentioned machine, for example by interposing in the circuits of the emitter, two coils B and B' in such manner that their variations of coupling cause a variation of the intensity of emission, and by leaving the coil B fixed, whilst the coil B' rotated by the axis above-mentioned X Y (or some other axis running in synchronism with it) rotates at the speed of $n$ rotations per second.

The current supplied by the emitter $E_3$ may also be modulated, utilizing an alternating current of low frequency $n$ produced by an alternator keyed on the spindle X Y.

According to a modification of the invention, the same result as with the receiver of Figure 2 may be obtained when the two carrier waves instead of having perfectly distinct high frequency waves $f$ and $f'$, have both the same high frequency $f$ and are made distinct by modulations effected by mean frequencies quite different from one another, $m_5$ and $m_6$.

The emitting station (Figure 4) comprises three aerials $A_4$, $A_5$, $A_6$.

The currents running through these aerials are:

$$i_4 = a_4 \cdot \cos\{2\pi(f+n)t + \alpha_4\}$$
$$i_5 = \{a_5 + b_5 \cos(2\pi m_5 t + \beta_5)\} \cdot \cos(2\pi f t + \alpha_5)$$
$$i_6 = \{a_6 + b_6 \cos(2\pi m_6 t + \beta_6)\} \cdot \cos(2\pi f t + \alpha_6)$$

respectively, $A_4$, $A_5$, $A_6$, $B_5$, $B_6$, $\alpha_4$, $\alpha_5$, $\alpha_6$, $\beta_5$, $\beta_6$ being constants, $t$ being time, $f$ a high frequency, $m_5$ and $m_6$ two mean frequencies quite distinct and $n$ a low frequency.

There will be for example:

$f = 1{,}000{,}000$ periods per second
$m_5 = 10{,}000$ periods per second
$m_6 = 15{,}000$ periods per second
$n = 100$ periods per second It will be seen that the aerial $A_4$ emits a pure wave of high frequency $f+n$, and that the aerials $A_5$ and $A_6$ emit modulated waves having both the same high frequency $f$, which only differs from that $f+n$ of the wave emitted by the aerial $A_6$, by a low frequency $n$.

The wave emitted by the aerial $A_5$ is modulated according to a mean frequency $m_5$. The wave emitted by the aerial $A_6$ is modulated according to an entirely distinct mean frequency $m_6$. The distances of a point M (Figure 4) from the aerials $A_4$, $A_5$, $A_6$, are respectively $r_4$, $r_5$, $r_6$ and the electromagnetic fields produced by the emissions from the aerials $A_4$, $A_5$, $A_6$ are respectively:

$$h_4 = c_4 \cdot \cos\{2\pi(f+n)t_4 + \alpha_4\}$$
$$h_5 = \{c_5 + d_5 \cos(2\pi m_5 t_5 + \beta_5)\} \cdot \cos(2\pi f t_5 + \alpha_5)$$
$$h_6 = \{c_6 + d_6 \cos(2\pi m_6 t_6 + \beta_6)\} \cdot \cos(2\pi f t_6 + \alpha_6)$$

$c_4$, $c_5$, $c_6$, $d_5$, $d_6$, being constants and the values $t_4$, $t_5$, $t_6$ being respectively equal to $$t - r_4/V,\ t - \frac{r_5}{V}$$

and $$t - \frac{r_6}{V}$$

$V$ being the velocity of propagation of the electromagnetic waves.

For greater clearness, the above expressions may be written:

$$h_4 = c_4 \cdot \cos\{2\pi(f+n)t + \gamma_4\}$$
$$H_5 = \{c_5 + d_5 \cos(2\pi m_5 t + \delta_5)\} \cdot \cos(2\pi f t + \gamma_5)$$
$$h_6 = \{c_6 + d_6 \cos(2\pi m_6 t + \delta_6)\} \cdot \cos(2\pi f t + \gamma_6)$$

the constants $\gamma_4$, $\gamma_5$, $\gamma_6$, $\delta_5$, $\delta_6$, having the following values:

$$\gamma_4 = \alpha_4 - 2\pi \frac{(f+n)r_4}{V}$$

$$\gamma_5 = \alpha_5 - 2\pi \frac{f r_5}{V}$$

$$\gamma_6 = \alpha_6 - 2\pi \frac{f r_6}{V}$$

$$\delta_5 = \beta_5 - 2\pi \frac{m_5 r_5}{V}$$

$$\delta_6 = \beta_6 - 2\pi \frac{m_6 r_6}{V}$$

The receiving station located at the point M comprises a receiver R (Figure 5) regulated in such manner as to receive high frequency waves equal to or adjacent to $f$, and thus sensitive to the fields $h_4$, $h_5$, $h_6$, and consequently to the electromotive force $u$ created by these fields in the receiver aerial and which has for expression:

$$u = k_4 h_4 + k_5 h_5 + k_6 h_6$$
$$= k_4 c_4 \cdot \cos\{2\pi(f+n)t + \gamma_5\}$$
$$+ k_5\{c_5 + d_5 \cos(2\pi m_5 t - \delta_5)\} \cdot \cos(2\pi f t + \gamma_5)$$
$$+ k_6\{c_6 + d_6 \cos(2\pi m_6 t - \delta_6)\} \cdot \cos(2\pi f t + \gamma_6)$$

$k_4$, $k_5$ and $k_6$ being constants.

After high frequency amplification and then detection the receiver R supplies a current of intensity $i$ which is transmitted simultaneously into two distinct apparatus $R_5$ and $R_6$ (Figure 5).

The apparatus $R_5$ is regulated so as to amplify the current of mean frequency equal to or in the vicinity of $m_5$ and to arrest the others, a problem which has long been solved. The apparatus $R_5$ will therefore only be sensitive to the portion of the current $i$ which varies according to a mean frequency equal or approximately equal to $m_5$.

It is clear that this partial current will arise simply from the beats or interferences of the following terms of the above expression in detail of the electromotive force $u$: on the one hand the term in $d_5$ and on the other hand the term in $c_4$, $c_5$ and $c_6$.

According to the theory of beats and detection, the intensity of this partial current has therefore for its value:

$$i_5 = q_1 d_5 \cdot \cos(2\pi m_5 t + \gamma_5)$$
$$\{k_4 c_4 \cos(2\pi n t + \gamma_4 - \gamma_5) + k_5 c_5 + k_6 c_6 \cdot \cos(\gamma_6 - \gamma_5)\}$$

$q_1$ being a constant and the angles $2\pi n t + \gamma_4 - \gamma_5$, and $\gamma_6 - \gamma_5$ being respectively the phase displacements existing at the point of reception M between the fields $h_4$ and $h_6$ and the field $h_5$.

For greater clearness, this expression can be written:

$$i_5 = \{q_2 \cos(2\pi n t + \gamma_4 - \gamma_5) + q_3\} \cdot \cos(2\pi m_5 t + \delta_5)$$

$q_2$ and $q_3$ being constants.

It will be seen that the current $i_5$ is a current of mean frequency $m_5$ modulated according to the low frequency $n$.

After amplification in mean frequency and then second detection, the apparatus $R_5$ will give at its outlet, according to the theory of detection, a current of low frequency $n$, the intensity of which is: $j_5 = q_5 \cdot \cos(2\pi n t + \gamma_4 - \gamma_5)$ $q_5$ being a constant and the angle $2\pi n t + \gamma_4 - \gamma_5$ being that which intervenes in the modulation of the current $i_5$.

In the same way, the apparatus $R_6$ regulated to the mean frequency $m_6$ like the apparatus $R_5$ to the mean frequency $m_5$, supplies after amplification and then a second detection a current of low frequency $n$ the intensity of which is: $j_6 = q_6 \cdot \cos(2\pi n t + \gamma_4 - \gamma_6)$ $q_6$ being a constant.

The currents $j_5$ and $j_6$ supplied separately by the apparatus $R_5$ and $R_6$ may, if it is necessary, be amplified separately by two distinct low frequency amplifiers. They are then taken into a phase meter P (Figure 5) which measures their $\delta$ phase displacement, giving the indication:

$$\psi = (2\pi n t + \gamma_4 - \gamma_5) - (2\pi n t + \gamma_4 - \gamma_6) + \gamma - \gamma' + \delta$$

$\gamma$ and $\gamma'$ being the phase displacements produced respectively by the two above-mentioned low frequency amplifiers and $\delta$ being a regulation constant of the phase meter.

As has been stated with reference to Figure 2, the expression: $\gamma - \gamma' + \delta$ may easily be cancelled.

The indication of the phase meter then becomes:

$$\psi = (2\pi nt + \gamma_4 - _5) - (2\pi nt + \gamma_4 - \gamma_6)$$
$$= \gamma_6 - \lambda_5$$
$$= 2\pi f \frac{r_5 - r_6}{V} + \alpha_6 - \alpha_5$$

The value: $\alpha_6 - \alpha_5$, regulation constant of the emitting station may be cancelled which amounts to placing in phase the current produced by the apparatus $E_5$ and $E_6$.

By calling $\lambda$ the length of wave corresponding to the frequency $f$, the indication of the phase meter becomes:

$$\psi = 2\pi \frac{r_5 - r_6}{\lambda}$$

that is to say that, as in the case of the device according to Figure 2 it measures the difference of the distances from the receiving station to the emitting aerials $A_5$ and $A_6$, these distances being measured in wave lengths $\lambda$.

The supply of the aerials of the emitting station, that is the aerials $A_4$, $A_5$, $A_6$ may be carried out in the following manner (Figure 6).

An emitter E supplies a pure sinusoidal current of high frequency $f$. This current is sent into two distinct apparatus $E_5$ and $E_6$. The apparatus $E_5$ amplifies, if necessary, the high frequency current $f$ which it receives. In any case, it modulates it under the effect of a current of mean frequency $m_5$ which is supplied to it by an oscillator $F_5$. The high frequency current $f$ thus modulated according to the mean frequency $m_5$, is sent into the aerial $A_5$.

In the same way, the apparatus $E_6$ amplifies if necessary the high frequency current $f$ supplied to it by the emitter E. In any case, it modulates it under the action of a current of mean frequency $m_6$ supplied thereto by an oscillator $F_6$. The high frequency current $f$ thus modulated according to the mean frequency $m_6$ is sent into the aerial $A_6$.

On the other hand, the aerial $A_4$ is supplied by an emitter $E_4$ regulated in such manner as to produce a pure high frequency wave $f + n$. This emitter $E_4$ may be completely independent of the rest of the station, it is sufficient for it to be regulated to a frequency sufficiently close to that of the emitter E so as to only differ from it by a low frequency.

It will be seen that the intensities of the currents thus obtained in the aerials $A_4$, $A_5$, $A_6$ have really the values $i_4$, $i_5$, $i_6$ mentioned above.

The supply of the aerial $A_4$ of the emitting station may also be carried out in the following manner: (Figure 7 where the same references indicate the same parts as in Figure 6).

The transmitter $E_4$ is suppressed and replaced by two apparatus $E_7$ and $E_8$ similar to $E_5$ and $E_6$. These two apparatus receive from the transmitter E, two distinct pure sinusoidal currents, displaced in phase one from the other by any known process. If necessary, they amplify separately these two currents. In any case, they modulate them under the effect of two distinct currents of the same low frequency $n$, displaced in phase the one with respect to the other and which may be provided by any source whatever.

The currents thus produced have respectively the following intensities:

$$i_7 = \{a_7 + b_7 \cos(2\pi nt + \beta_7)\} \cdot \cos(2\pi ft + \alpha_7)$$
$$i_8 = \{a_8 + b_8 \cos(2\pi nt + \beta_8)\} \cdot \cos(2\pi ft + \alpha_8)$$

$a_7$, $a_8$, $b_7$, $b_8$, $\alpha_7$, $\alpha_8$, $\beta_7$, $\beta_8$, being constants. They are added one to the other (for example as shown by Figure 7) and sent into the aerial $A_4$. It is to be noted that apparatus $E_7$ and $E_8$ may have one part $E'_4$ in common, the object of which is simply that of amplification.

It will be seen that by regulating the two phase displacements above mentioned in such manner that:

$$\alpha_7 - \alpha_8 = \frac{\pi}{2}$$
$$\beta_7 - \beta_8 = \frac{\pi}{2}$$

and regulating the apparatus so that $b_7 = b_8$, the intensity of the total current flowing through the aerial $A_4$ will be:

$$i_7 + i_8 = c_7 \cos(2\pi ft + \gamma_7) + d_7 \cos\{2\pi(f+n)t + \delta\}$$

$c_7$, $d_7$, $\gamma_7$, $\delta_7$, being constants.

It is easy to prove that this variation will give the same final result as the first method of supply indicated above.

In certain cases, it may be advisable not to effect exactly the above-mentioned regulation, in particular not to make the intensities $b_7$ and $b_8$ equal. The relation connecting $\psi$ to the difference $r_5 - r_6$ then becomes more complex, but the sensitiveness of $\psi$ with respect to the difference $r_5 - r_6$ can thus be reduced or increased, a possibility which is sometimes of advantage.

In addition to the advantage consisting in utilizing only a single carrier wave, the device forming the object of the above variation presents various particularly advantageous possibilities in the case of a complex emitting station permitting a receiving station to effect simultaneously a number of different measurements respecting its position.

This case is that for example of the emitting station which it is necessary to erect on an aerodrome to permit aircraft to land in bad visibility.

One of these possibilities consists in establishing at the emitting station one or more supplementary aerials fulfilling a part similar to that of one of the aerials $A_3$ and $A_4$, which are retained. There will be, for example, an aerial $A_9$ traversed by a current of intensity:

$$i_9 = \{a_9 + b_9 \cos(2\pi m_9 t + \beta_9)\} \cdot \cos(2\pi ft + \alpha_9)$$

$a_9$, $b_9$, $\alpha_9$, $\beta_9$, being constants, and $m_9$ being a mean frequency perfectly distinct from $m_5$ and from $m_6$.

The aerial $A_9$ is supplied in a manner identical with the aerials $A_5$ and $A_6$.

At the receiving station, an apparatus $R_9$ regulated to the mean frequency $m_9$, plays a part similar to that of the apparatus $R_5$, and $R_6$. A phase meter P' measuring the phase displacement of the current supplied by the apparatus $R_9$ with the current $j_5$ for example, gives the indication:

$$\psi' = 2\pi \frac{r_5 - r_9}{\lambda}$$

$r_9$ being the distance from the receiving station to the aerial $A_9$.

A second advantageous possibility in the case of the very complex emitting stations consists in utilizing simultaneously two or more stations' similar to that comprising the three aerials $A_4$, $A_5$, $A_6$, which has been described and shown by Figure 4. The high frequency utilized in this case by one station is quite different from those utilized by the others. The mean frequencies used by one station may be equal to or different from those utilized by the others. But the low frequency $n$ is everywhere the same. This is particularly easy if the method of supply is used in which the currents of frequency $n$ are supplied by the same source of alternating current.

The method of supply in Figure 7 may also be used, but for one station only. The source of alternating current supplying the other stations with the currents of frequency $n$ is then replaced by a receiver identical with R, preferably followed by an apparatus identical with $R_5$ and which by detection supplies a current of frequency $n$.

The receiving station comprises, on the other hand, two or more units similar to that constituted by the receiver R and the apparatus such as $R_5$ and $R_6$. In addition to the indications supplied by each of these units, it can be seen that the relative displacement of phase of one of the detected currents of frequency $n$ supplied by one of these units can be measured with a similar current supplied by another unit, which increases the number of measurements independent one of the other which are possible.

The advantages of the method of locating according to the present invention as compared with those already known, are as follows:

The receiving station is of simple character and particularly easy to regulate (regulation identical with that of an ordinary receiver), and to use (since these indications are given by direct reading). It does not comprise any moving mechanical part, and comprises only a single wave collector, which may be an aerial. The major part of this station is, furthermore, immediately utilizable for the reception of telegraphic or telephonic communications. The indications of the apparatus are independent of the direction in position of the receiving station, a point which is of particular interest if it is mounted on an aircraft.

The emitting station itself is very simple and easy to use, since it consists simply of a supervising role.

Both as regards emission and reception, all the apparatus used are perfectly well known and require no particular care either in their construction or in their use.

It should also be pointed out that the invention is not limited to the embodiment described of the transmitting station, and it is clear that many modifications of detail may be made in the methods and embodiments described without departing from the scope of the invention.

What I claim and desire to secure by Letters Patent of the United States is:

1. A method for radioelectrically indicating the difference in the distances between a point of reception and two distinct transmission points, consisting of simultaneously emitting a plurality of carrier waves of different frequencies from said two distinct transmission points and obtaining by interference consisting in superimposing said different frequencies upon one another a combination of a superior frequency with a low frequency, producing a combination of a superior frequency differing from said first named superior frequency with a low frequency, obtaining from said combination two currents of the same low frequency but differing in phase and comparing the phases of said two currents.

2. A method for radioelectrically indicating the difference in the distance between a point of reception and two distinct transmission points, consisting in simultaneously emitting a pair of carrier waves of different frequencies respectively from said two distinct transmission points, one of said frequencies differing from the other frequency by a low frequency, obtaining by interference a combination of a radio frequency with said low frequency by means of the step consisting in superimposing said different frequencies upon one another, emitting a supplementary carrier wave having a frequency markedly different from said interfering frequencies, so as to constitute another combination of a radio frequency with said low frequency by modulating with said low frequency the said supplementary carrier wave, obtaining from said combinations two currents of the same low frequency but differing in phase, and comparing the phase of said two currents.

3. A method for radioelectrically indicating the difference in the distance between a point of reception and two distinct transmission points consisting of simultaneously emitting a plurality of carrier waves of the same carrier frequency, each modulated by a different intermediate frequency, emitting a supplementary carrier wave, the frequency of which differs from the frequency of said first mentioned carrier waves by a slight predetermined value equal to a low frequency, causing the carrier waves of same frequency to interfere between themselves and with the supplementary wave, receiving said waves, selecting the modulating intermediate frequencies on reception, obtaining thereby a combination of one of said intermediate frequencies with the low frequency and a second combination of the other intermediate frequency with the low frequency, obtaining therefrom two currents of the same low frequency but differing in phase and comparing the phases of said currents.

4. A radioelectric transmitter comprising three aerials, two of which are separated by a definite distance, means to supply said two aerials respectively by two high frequencies slightly different, means to supply the third aerial with a high frequency markedly different, a local receiver for collecting the emissions of the two first aerials, said receiver comprising means for mixing and detecting said emissions in order to collect in the receiver output a current of a frequency equal to the difference of their frequencies and means to modulate by this current the emission from the third aerial.

5. A radioelectric transmitter comprising three aerials, two of which are separated by a definite distance, means to supply one of these last two aerials with a high frequency current, a source of low frequency current with means to superimpose this low frequency current on the said high frequency current and means to supply the second of said two aerials with the frequency resulting from the superposing, means to supply the third aerial with a high frequency markedly different from that of the first aerial, and means to modulate the current supplying the third aerial by the current from the said source of low frequency.

6. A radioelectric transmitter comprising three aerials, two of which are separated by a definite distance, means to supply said two aerials with a high frequency carrier, means to modulate the currents supplying these aerials respectively by two intermediate frequencies markedly different and an independent current source to supply the third aerial, the current frequency of this source having a slight difference with respect to the said carrier frequency.

7. A radioelectric transmitter comprising three aerials, two of which are separated by a definite distance, a source of carrier high frequency supplying directly said two aerials, means to modulate the supply currents of these two aerials respectively by two intermediate frequencies markedly different, a plurality of channels traversed by the current of the said source and means to change the phase of the current in each channel, a source of low frequency current connected with said channels so as to modulate the said carrier frequency by the said low frequency, means for superimposing said modulated current in the output of said channels, means for making said carrier frequency and said low modulating frequency phases of such a value that the combined current resulting from superposition has a frequency component which differs from the said carrier frequency by the mentioned low frequency, means for collecting said combined current, and means to supply the third aerial with this combined current.

ETIENNE AUGUSTIN HENRI HONORÉ.